United States Patent Office 3,253,618
Patented May 31, 1966

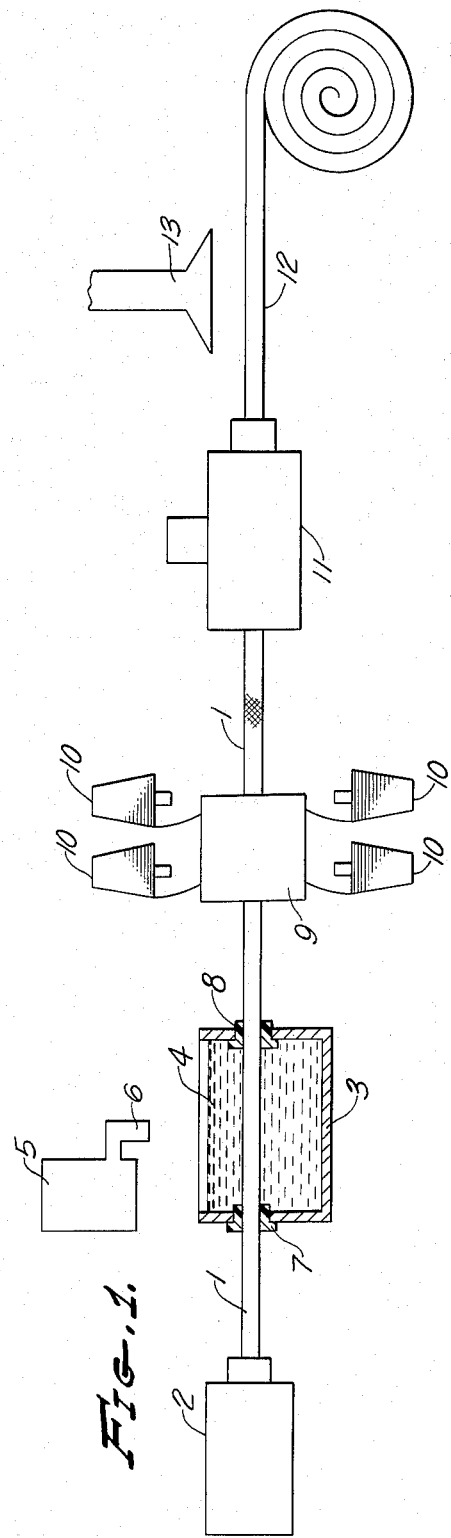
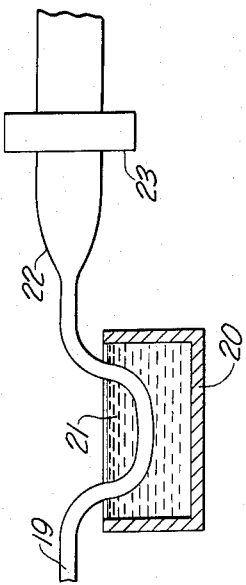
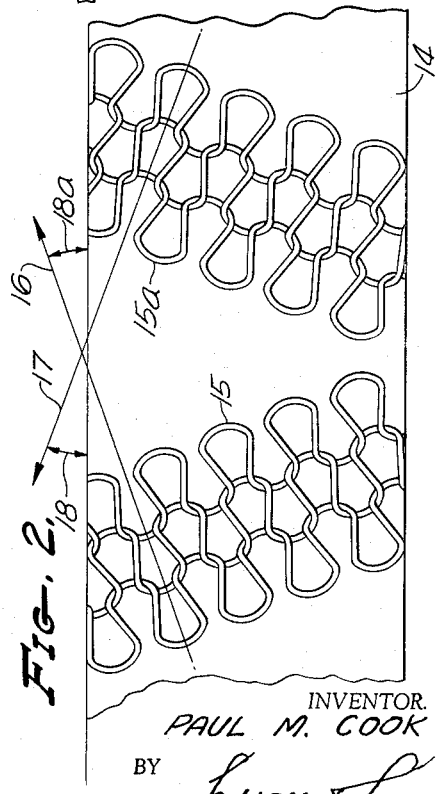
INVENTOR.
PAUL M. COOK
BY
Lyon & Lyon
ATTORNEYS

3,253,618
REINFORCED ARTICLE AND PROCESS
Paul M. Cook, Atherton, Calif., assignor to Raychem Corporation, Redwood City, Calif., a corporation of California
Filed Oct. 28, 1963, Ser. No. 319,486
24 Claims. (Cl. 138—125)

The present application is a continuation-in-part of my copending application Serial No. 228,300, filed October 4, 1962.

The present invention relates to articles having memory characteristics which are provided with reinforcing means comprising knitted strands. The present invention also relates to the process of producing these articles. The present invention is particularly suitable for use with materials possessing the property of elastic (or plastic) memory, i.e., materials which are capable of changing dimension upon the application of heat. Many such materials are known, e.g., those disclosed in Patent No. 2,027,962, and Cook et al. Patent No. 3,086,242. As disclosed in the latter patent, irradiated polymers are extremely suitable for use in making elastic memory materials. As disclosed in these patents, such materials are independently dimensionally heat unstable, i.e., capable of changing dimension upon the application of heat alone to assume a predetermined configuration and a heat stable condition.

Although known elastic memory materials have been found useful in many environments, it has been recognized that the utility of these materials could be increased if the strength of these materials could be increased without detriment to the memory and other properties of the materials. It is, of course, known to add fiber reinforcement to plastic and polymeric materials. However, known reinforcements such as matted strands are not suitable for use in memory materials since they would substantially prevent the desirable dimensional change of such materials. This problem has been particularly difficult with regard to tubular memory articles which undergo a substantial change in radial dimension when exposed to heat.

One approach to providing reinforcement in tubular elastic memory articles was to provide braided fibers because the braid construction permitted a change in diameter. However, tubular memory materials which are shrinkable and which are reinforced with braided fibers must necessarily change in length when the diameter thereof is reduced by shrinkage. However, in many environments, e.g., splices for electric cables, it is desirable that increase in length upon shrinkage be held to a minimum because of the limited space available for such axial extension.

Thus, it is a primary object of the present invention to provide a memory material having a reinforcement which does not undesirably interfere with the dimensional change of the memory material and the process of producing this reinforced material.

It is another object of the present invention to provide a reinforced memory material having a tubular shape which will undergo a minimum change in axial length when the diameter thereof is reduced and the process of producing this reinforced material.

It is a further object of the present invention to produce a memory material having a knitted reinforcement and the process of producing this material.

Other objects and advantages of the present invention, it is believed, will be apparent from the following detailed description of specific embodiments thereof when read in connection with the drawings.

Briefly, the present invention comprises a memory material which has been provided with a reinforcing material which will not undesirably interfere with the dimensional change thereof. In the preferred embodiment of the present invention, the memory material is provided with a knitted reinforcement. For example, if the memory material has a tubular shape, the knitted reinforcement may be provided on the inner surface, on the outer surface, or as an internal reinforcement. Furthermore, the reinforced articles of the present invention may be combined with fusible members in the manner disclosed in Wetmore application Serial No. 211,747, filed July 23, 1962, the disclosure of which application is incorporated herein by reference. These fusible members may be provided on the inside or outside surfaces of the reinforced article. Furthermore, the elastic memory material and/or the fusible member may be combined with the knitted reinforcement by compound extrusion, e.g., according to the method disclosed in Cook application Serial No. 228,300, filed October 4, 1962, the disclosure of which application is incorporated by reference herein, or by other known compound extrusion processes.

The knitted reinforcement which is used in the present invention may comprise an ordinary knit stitch. However, such a stitch does have a tendency to twist, particularly in tubular articles when these articles undergo a change in dimension. Therefore, it is preferred to use a reinforcement comprising two knitted layers, one layer comprising a "left-hand" stitch and the other comprising a "right-hand" stitch such that the twisting tendency of each layer counteracts the twisting tendency of the other. Furthermore, it is preferred to provide the knitted reinforcement in such a manner that the "axis" of each of the superimposed layers is at an angle to the "axis" of the other and, in the case of tubular articles, such that the axis of the tube is at an angle to the axis of the layers. Still further, the layers of knitted reinforcement may be provided such that they are interwoven with each other.

The knitted reinforcement may comprise any suitable fiber material, e.g., glass, metal, textile fibers, synthetic fibers, polymeric materials, etc. More specifically, fibers made from polyamides such as polyhexamethylene adipamide, polyesters such as polyethylene terepthalate, polyolefins such as polyethylene and polypropylene, polyvinyl chloride, polyacrylonitrile, polystyrene, polyvinylidene halides such as polyvinylidene chloride as examples of those which may be used. If desired, the fibers may be made from a conductive material such as copper. In this case, the fiber may function as a shielding in an insulating material as well as a reinforcement. In many cases, the choice of fiber will, of course, depend upon the end use to which the reinforced article is to be put. It is often desirable to use fibers which are provided with coatings which make them particularly suitable for a given use. This is especially true of glass fibers which are commercially available with a variety of coatings, e.g., epoxy coatings. In general, the coatings should impart good adhesion properties and good moisture resistance properties to the fiber.

It is also preferred to provide the knitted reinforcement with an adhesive to facilitate a good bond between the reinforcement and the elastic memory material with which it is combined. In general, the adhesive should be an effective bonding agent for each of the materials with which it comes in contact. For example, if the reinforcement comprises an internal element in the finished article, the adhesive should be an effective bonding agent for the jacket, core and reinforcing fiber. The adhesive should also offer only low resistance to movement of the knit reinforcement under recovery conditions which conditions include elevated temperatures in most instances, be sufficiently fluid to be an effective impregnating material and preferably not lose viscosity at elevated temperatures such that it has a tendency to be squeezed out of the reinforced article under recovery conditions. Thus, although the adhesive must be sufficiently fluid to effectively impregnate the knitted reinforcement, it must also be capable of being converted from a fluid to a material which will not flow to a substantial extent under the recovery conditions of the elastic memory material. Preferably, the adhesive is capable of being converted from a fluid to an elastic material, but conversion to other materials having a minimum tendency to flow is permissible. The conversion of the adhesive may be accomplished by any suitable means, e.g., the application of heat to cure the adhesive, but it is convenient to cause this conversion by irradiation which will cause cross-linking of some adhesives.

In general, the use of an adhesive is desirable because of the difficulty involved in attempting to impregnate the knitted reinforcement with elastic memory material and because the adhesive minimizes any tendency of the reinforcement to interfere with the dimensional change of the memory material.

Although other methods can be used, it has been found preferable to form the knitted reinforcement as it is being applied to the elastic memory material. In a typical embodiment of the present invention, an inner tube (core) is first extruded to specified dimensions. The core is then presaturated with an adhesive while simultaneously knitting and applying the reinforcing material to the core. The knitted reinforcement is thus applied over a thin film of adhesive. The knit-reinforced core is then again saturated with the adhesive and the outer tube (jacket) is applied. As previously described, the adhesive functions to bond the knitted reinforcement as an integral tube and also bonds the reinforcement to the concentric core and jacket such that the entire cross-section becomes an integral unit. It is desirable to exert pressure within the core in order to assure a concentric product. In the preferred embodiment of the present invention, the adhesive and one or both of the core and jacket are capable of being cross-linked by irradiation. In this embodiment, the laminated core, jacket and reinforcement are then subjected to irradiation. The product may then be heated, expanded, and cooled in the expanded condition to produce an elastic memory material having a knitted reinforcement which will not undesirably interfere with the recovery of the expanded product upon the application of heat.

Referring now to the drawings, FIGURE 1 is a schematic diagram of the process of reinforcing a tubular article according to the present invention.

FIGURE 2 is a diagrammatic illustration of a reinforced article produced according to the present invention.

FIGURE 3 illustrates a method of imparting the property of elastic memory to a reinforced article produced according to the present invention.

As illustrated in FIGURE 1, a preferred embodiment of the present invention comprises extruding core 1 from extruder 2 and then passing the extruded core through saturation pan 3 which contains adhesive 4. Adhesive 4 may be supplied to pan 3 from tank 5 through nozzle 6. Pan 3 is also provided with seal 7 which prevents leakage of adhesive from the pan on the core inlet side and wiping seal 8 which functions to maintain a thin layer of adhesive on the core as well as preventing leakage.

Core 1 is then passed through knitting machine 9. Knitting machine 9 may be of any conventional type and a Sinfra type knitting machine is preferred. Reinforcing strands are fed to the knitting machine from reels 10. After the knitted reinforcement has been applied to the core, it is preferred to pass the core and reinforcement through an additional saturating pan (not shown) such as saturating pan 3. The core and reinforcement then enter extruder 11 where a jacket 12 is extruded around the core and reinforcement. The combined core and jacket may then be subjected to irradiation by any suitable source of irradiation, e.g., a 2 mev. electron beam generator, to cross-link one or more of the jacket, core and adhesive.

The preferred method of applying the knitted reinforcement of the present invention is illustrated in FIGURE 2. In this figure, tube 14 is provided with two layers of knitted reinforcement 15 and 15a. The "axis" or "direction" of reinforcement 15 is indicated by arrow 16. The additional layer of knitted material 15a having an "axis" in the direction indicated by arrow 17 is also provided. Axis 16 makes an angle 18a with the axis of the tube and axis 17 makes corresponding angle 18. For the purpose of clarity, the layers of reinforcement have not been illustrated in overlapping form, but it is to be understood that a preferred embodiment comprises a pair of substantially coextensive layers of reinforcement. It is preferred to provide a double layer of knitted reinforcing material in this manner because a single layer has a tendency to twist. By arranging the two layers of reinforcing material in the manner illustrated in FIGURE 2 such that the twisting tendency of each counteracts the twisting tendency of the other, the twisting problem is eliminated.

It has been found that the article of the present invention is capable of a maximum amount of radial change in dimension with the least amount of axial change in dimension when angle 18 between the axis of the knit and the axis of the tube is from about 15° to about 19°. The preferred angle is about 15°. When a second layer of reinforcement is provided, the axis 18a of this layer should also make an angle of from about 15° to about 19°, preferably about 15°, with the axis of the article. Thus, the angle between the axes of the two layers should be from about 30 to about 38°. When these angles are used, it has been found that a 100% expansion in a radial direction may be obtained with a change in length of less than about 10% and that a 75% expansion in a radial direction may be obtained without any change in length. The 15°–19° angle range for the axis of the knit reinforcement is of greatest significance when large expansions on the order of about 75%–100% are desired. As the amount of expansion is decreased, a wider range of axis angles may be used to obtain minimal changes in length. For example, if an expansion of 50% with a certain maximum change in length is desired, only routine experimentation is required to use the concept of the present invention to determine that range of axis angles which will provide the desired characteristics. It is preferred to form the knitted stitches with loose loops such that the knitted reinforcement will be easily capable of changing radial dimension with the heat recoverable member with which it is combined. The coverage of the knitted reinforcement on the surface of the reinforced article may be varied according to the strength and memory characteristics which are desired. A plurality of knitted strands may be applied simultaneously if desired.

FIGURE 3 is a diagrammatic illustration of a reinforced tube 19 being passed through a tank 20 which contains a heating liquid 21. A pressure source (not shown) may be used to exert pressure on tube 19 such that expansion takes place as indicated by numeral 22. It is desirable that the reinforced tube of the present invention be maintained in a relaxed or slack condition during expansion in order to minimize the pressure differential required for expansion. When the tube has expanded to the desired diameter, it is passed through cooling means 23 and cooled in the expanded condition while still under pressure. This expanded article may then be caused to assume its original dimensions by the application of sufficient heat. It is to be understood that any technique for imparting elastic memory to the articles of the present invention may be used. A preferred technique is that disclosed in Cook et al. Patent No. 3,086,242.

In a typical example of the process of the present invention, in which all parts are by weight, a composition comprising 63.75 parts low density polyethylene (DYNK, manufactured by Union Carbide), 4.37 parts high density polyethylene (Hi-Fax 1400E, manufactured by Hercules Powder Co.), 0.69 part 4,4'-thiobis-(6-tert-butyl-m-cresol) and 2.27 parts triallyl cyanurate was heated to a temperature of 310° F. and extruded with an inside diameter of 0.050 inch and a wall thickness of 0.013 inch. A low drawdown ratio of 1.5:1 was used to decrease linear orientation and to decrease shrinkback of the core from the unit. Generally, it is preferred to use the lowest possible drawdown ratio. The core was then passed through a saturation pan such as that illustrated in FIGURE 1 and was coated with a thick film of an adhesive comprising 51.70 parts of a polyamide having free amino groups (Versamid 100, manufactured by General Mills), 5.67 parts polyamide (Versamid 940, manufactured by General Mills), 0.87 part trimerized dihydrotrimethyl quinoline (Agerit Resin D, manufactured by R. T. Vanderbilt), 24.0 parts oleic acid and 1.0 part methylene bisacrylamide. After the methylene bisacrylamide is added to the remaining constituents, this adhesive has an extremely short pot life at temperatures in excess of 100° C. This pot life is about 1.5 hours at a maximum temperature of 100° C. Thus, the methylene bisacrylamide should not be added to the remaining constituents until shortly before the adhesive is applied to the core. The adhesive was applied at a temperature of about 135° C.

The adhesive coated core was then passed through a model C3H Sinfra knitting machine. This knitting machine was provided with eight reels of 150 1/0 epoxy fiberglass (manufactured by Owens Corning). In order to balance torsional stresses, four ends were knitted in one direction and four additional ends were knitted at an angle to the other ends in the general manner illustrated in FIGURE 2 by using two heads with four needles mounted in each head. The angle of application of the knit is determined by the pull-out rate since the rotational speed of the applicating heads of the knitting machine are constant. In this example, a pull-out speed of 100 feet per minute was used and the head speed was 540 r.p.m. The needles used were #10 gauge long Torrington needles.

The same adhesive as that previously described was then applied over the knitted reinforcement at a temperature of 135° C. Internal pressure sufficient to prevent collapsing was also applied at this time. A jacket having the same composition as the core was extruded over the adhesive coated reinforcement to form a composite tube having a jacket with a wall thickness of 0.013 inch. This composite tube was then irradiated to a dose of 12 megarads by a 2 mev. electron beam generator.

The composite tube was then expanded by passing it through a glycerine bath having a temperature of 295° F. and then applying a pressure differential of about 5 p.s.i. to the interior of the tube in order to expand it. The tube was then cooled in the expanded condition to form a reinforced article having the property of elastic memory. Unlike tubes fabricated from elastic memory materials which have been reinforced with braided fibers, the reinforced tube of the present example does not shorten appreciably during expansion due to the presence of the knitted reinforcement. Likewise, when sufficient heat is applied to the expanded tube of the present invention to cause it to tend to assume its original configuration, there is comparatively very little change in length. In general, this change in length can be maintained at 10% or less by the practice of the present invention.

There is very little tendency for the reinforced tubular articles of the present invention to change in length when they change in diameter because the fiber in the knit construction loops back and forth in relatively loose loops. Thus, there is a considerable amount of "give" and stretch in the knit construction thereby permitting the use of substantially non-elastic fibers to produce a reinforcing structure which is capable of undergoing a substantial change in radial dimension without a substantial change in axial dimension. This is in marked contrast to a reinforcement having a braid construction in which each fiber continuously moves in an advancing helix around the tube thereby precluding the braid construction from having any "give" or stretch.

In general, the present invention contemplates the provision of a knitted reinforcement to any heat recoverable material having the property of elastic memory, e.g., the materials disclosed in Patents Nos. 2,027,962 and 3,086,242. Thus, included among the materials which may be reinforced according to the present invention are polymers, or admixtures or blends containing polymers selected from the group consisting of (1) crystalline polymers which exhibit elastomeric properties either at or above their crystalline melting range, i.e., thermoplastic polymers and copolymers such as polytetrafluoroethylene, high molecular weight polypropylene and polyethylene, etc., and (2) crystalline polymers and copolymers including polyolefins such as polyethylene and polypropylene, vinyls such as polyvinylchloride and polyvinylacetate and copolymers thereof, polyamides, polyesters, polyvinylidene fluoride, polyurethanes, heat shrinkable rubbers such as the silicone rubber and others disclosed in my copending application Serial No. 65,953, filed October 31, 1960, etc., which have been cross-linked by chemical methods or by irradiation. The cross-linking irradiation may be irradiation with high energy electrons, ultraviolet rays, atomic pile irradiation or other suitable irradiation.

The present invention may, of course, be applied to produce reinforced articles other than tubes. Caps, splice closures, etc., are among the structures which may be produced according to the present invention. Furthermore, the reinforced elastic memory articles of the present invention may be combined with fusible members in the manner disclosed in Wetmore application Serial No. 211,747, filed July 23, 1962. Thus, for example, the articles of the present invention may comprise a tubular elastic memory article having a knitted reinforcement positioned on the outer surface, on the inner surface or internally. In addition, any one of these reinforced articles may have a fusible insert on the inner, outer or both surfaces thereof.

In general, it is preferred to use fibers which are substantially non-elastic for the knitted reinforcement in the article of the present invention since the reinforcing properties of such fibers are generally superior to those of elastic fibers. However, the elasticity of the reinforcing fibers may be increased to the extent the modification of the properties of the article which will result therefrom may be desired or tolerated. In this regard, it should be pointed out that one of the most significant contributions of the present invention is that it makes possible the use of fibers which are entirely non-elastic as a reinforcing medium in a heat recoverable article without interfering with the dimensional change of the article.

It will be readily apparent to those skilled in the art that various types of knit stitches may be used in the present invention. For example, the plain stitch illustrated in FIGURE 2 may be used or a lock stitch may be used. The wale-to-course ratio of these stitches will influence the amount of expansion which the knitted reinforcement will permit. In general, a decrease in the wale-to-course ratio will result in an increase in the expansion capability of the reinforced article. Given the concept of the present invention, only routine experimentation is required to determine the appropriate wale-to-course ratio for a given article.

Having fully described the present invention, it is to be understood that it is not to be limited to the specific details set forth, but is of the full scope of the appended claims.

I claim:
1. A heat recoverable article comprising an independently dimensionally heat unstable material which is capable of changing dimension upon the application of heat alone to assume a predetermined configuration and a heat stable condition, a knitted reinforcement which is coextensive with at least a portion of said material and an adhesive, said adhesive bonding said reinforcement to said article having a low resistance to the movement of said reinforcement and having substantially no tendency to lose viscosity to a degree such that it would be squeezed out of said article at a temperature sufficient to cause said material to change dimensions.

2. A heat recoverable article comprising a tube of independently dimensionally heat unstable material which is capable of changing dimension upon the application of heat alone to assume a predetermined configuration and a heat stable condition and a knitted reinforcement which is coextensive with at least a portion of said tube and physically attached to said tube, said knitted reinforcement comprising at least two tubes of knitted material, the knit of each of said tubes having an axis and each of said axes being at an angle to the other.

3. The article of claim 2 wherein said reinforcement is positioned internally in said article.

4. A process which comprises applying a fluid adhesive to an independently dimensionally heat unstable material which is capable of changing dimension upon the application of heat alone to assume a predetermined configuration and a heat stable condition, applying a knitted reinforcement to that portion of the material which is covered with adhesive, and converting said adhesive to a binder which has substantially no tendency to lose viscosity to a degree such that it would be squeezed out of said article at a temperature sufficient to cause said material to change dimension, thereby bonding said reinforcement to said material.

5. A process comprising applying an adhesive to a tube comprising an indendently dimensionally heat unstable material which is capable of changing dimension upon the application of heat alone to assume a predetermined configuration and a heat stable condition, applying a knitted reinforcement to the portion of said tube which is covered with said adhesive, said knitted reinforcement being applied in at least two layers, each of which layers is a knitted tube, the knit of which has an axis, the axis of each layer being at an angle to the other, said angle being such that it substantially prevents said tube from twisting when said tube is caused to change dimension, and converting said adhesive to a material which has substantially no tendency to lose viscosity to a degree such that it would be squeezed out of said article at temperatures sufficient to cause said tube to change dimension, thereby bonding said reinforcement to said tube.

6. The process of claim 5 wherein the axis of at least one of said layers makes an angle of about 15° to about 19° with the axis of said tube.

7. A process comprising applying an adhesive to a polymeric material, bonding a knitted reinforcement to said polymeric material with said adhesive and rendering said polymeric material independently dimensionally heat unstable such that it is capable of changing dimension upon the application of heat alone to assume a predetermined configuration and a heat stable condition.

8. A process comprising applying adhesive to a tube of polymeric material, applying a knitted reinforcement to said tube, said reinforcement comprising at least two layers, each of said layers being a knitted tube the knit of which has an axis and the axis of each layer being at an angle to the axis of the other whereby said tube has substantially no tendency to twist when changing dimension, converting said adhesive to a material which has substantially no tendency to lose viscosity to a degree such that it would be squeezed out of said article at temperatures sufficient to cause said tube to change dimension and rendering said polymeric material independently dimensionally heat unstable such that it is capable of changing dimension upon the application of heat alone to assume a predetermined configuration and a heat stable condition.

9. The process of claim 8 including the step of applying a fusible material to at least one surface of said tube.

10. The process of claim 8 wherein said tube is irradiated.

11. A heat recoverable article comprising an independently dimensionally heat unstable material which is capable of changing dimension upon the application of heat alone to assume a predetermined configuration and a heat stable condition, a knitted reinforcement and a fusible member, said fusible member being on an exposed surface of said article such that a change in dimension of said article will cause movement of said member.

12. A heat recoverable article comprising an independently dimensionally heat unstable material which is capable of changing dimension upon the application of heat alone to assume a predetermined configuration and a heat stable condition and a knitted reinforcement wherein said material comprises an irradiated polymer.

13. A heat recoverable article comprising a tube of independently dimensionally heat unstable material which is capable of changing dimension upon the application of heat alone to assume a predetermined configuration and a heat stable condition and a knitted reinforcement physically attached to said tube, said reinforcement having an axis, and the axis of said reinforcement being at an angle to the axis of the tube whereby the tube is capable of undergoing a substantial change in radial dimension without a substantial change in axial dimension.

14. The article of claim 13 wherein said reinforcement comprises a substantially nonelastic fiber.

15. The article of claim 13 wherein said reinforcement comprises a glass fiber.

16. The article of claim 13 wherein said reinforcement comprises a conductive fiber.

17. A heat recoverable tubular article comprising a tube of independently dimensionally heat unstable material which is capable of changing dimension upon the application of heat alone to assume a predetermined configuration and a heat stable condition, and knitted reinforcement physically attached to said tube, said material comprising the wall of said article and said reinforcement comprising a knitted tube which is coextensive with at least a portion of said wall wherein the axis of said reinforcement makes an angle of about 15° to about 19° with the axis of said article.

18. The article of claim 17 wherein the axis of said reinforcement makes an angle of about 15° with the axis of said article.

19. A heat recoverable article comprising an independently dimensionally heat unstable material which is capable of changing dimension upon the application of heat alone to assume a predetermined configuration and a heat stable condition, a reinforcement which is coextensive with at least a portion of said material which will not undesirably interfere with the dimensional change of said material, and an adhesive bonding said reinforcement to said material, said adhesive having a low resistance to the movement of said reinforcement and having substantially no tendency to lose viscosity to a degree such that it would be squeezed out of said article at a temperature sufficient to cause said material to change dimensions.

20. A process comprising physically attaching a knitted reinforcement to a tube of polymeric material, said reinforcement having an axis, and the axis of said reinforcement being at an angle to the axis of the tube whereby the tube is capable of undergoing a substantial change in radial dimension without a substantial change in axial dimension, rendering said polymeric material independently dimensionally heat unstable such that it is capable of changing dimension upon the application of heat alone to assume a predetermined configuration and a stable condition.

21. A heat recoverable article comprising a tube of independently dimensionally heat unstable material which is capable of changing dimension upon the application of heat alone to assume a predetermined configuration and a heat stable condition and a knitted reinforcement, said knitted reinforcement comprising at least two tubes of knitted material the knit of each of said tubes having an axis and each of said axes being at an angle to the other, the axis of the knit of each knitted tube of reinforcement being at an angle with the axis of said tube.

22. The article of claim 21 wherein the angle between the axes of the knit of said knitted tubes is such that said tube has substantially no tendency to twist when said tube changes dimensions.

23. The article of claim 21 wherein the axis of the knits of each knitted tube makes an angle of about 15° to about 19° with the axis of said article.

24. The article of claim 21 wherein the axis of the knit of at least one knitted tube makes an angle of about 15° with the axis of said article.

References Cited by the Examiner

UNITED STATES PATENTS

| | | | |
|---|---|---|---|
| 213,363 | 3/1879 | Wakeman | 138—127 |
| 637,719 | 11/1899 | Elleser | 138—125 |
| 1,396,789 | 11/1921 | Short | 138—124 |
| 2,027,962 | 1/1936 | Currie | 264—230 |
| 2,250,008 | 7/1941 | Carter et al. | 66—9 |
| 2,393,496 | 1/1946 | Stedman | 138—126 |
| 2,668,133 | 2/1954 | Brophy et al. | |
| 2,692,406 | 10/1954 | Rhodes et al. | 264—230 X |
| 2,749,943 | 6/1956 | Nemeth | 138—125 |
| 2,768,925 | 10/1956 | Fay. | |
| 2,781,552 | 2/1957 | Gray | 264—230 X |
| 2,788,804 | 4/1957 | Larkin | 138—125 |
| 2,870,619 | 1/1959 | Greczin | 138—125 X |
| 2,932,065 | 4/1960 | Jenkins | 138—125 X |

OTHER REFERENCES

Charlesby, A.: "How Radiation Affects Long-Chain Polymers," in June 1954. Nucleonics, pages 18–25, Class 161, Irradiated Plastics Digest.

Wakeman, R. L.: The Chemistry of Commercial Plastics, New York, Reinhold, 1947, pages 555 and 568.

LAVERNE D. GEIGER, *Primary Examiner.*

LEWIS J. LENNY, *Examiner.*

C. HOUCK, *Assistant Examiner.*